United States Patent
Kasai

(10) Patent No.: US 7,412,155 B2
(45) Date of Patent: Aug. 12, 2008

(54) IMAGING APPARATUS HAVING A CONTINUOUS SHOOTING FUNCTION

(75) Inventor: Yasushi Kasai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 596 days.

(21) Appl. No.: 11/014,607

(22) Filed: Dec. 16, 2004

(65) Prior Publication Data

US 2005/0140808 A1 Jun. 30, 2005

(30) Foreign Application Priority Data

Dec. 26, 2003 (JP) ............................. 2003-435125

(51) Int. Cl.
*H04N 5/765* (2006.01)
(52) U.S. Cl. .................... 386/120; 348/231.2
(58) Field of Classification Search ................. 386/117, 386/69, 96, 107, 120; 348/231.99, 231.6, 348/362, 231.2
See application file for complete search history.

(56) References Cited

U.S. PATENT DOCUMENTS

| | | | |
|---|---|---|---|
| 5,719,987 A * | 2/1998 | Kawamura et al. .......... 386/120 |
| 5,812,736 A * | 9/1998 | Anderson .................... 386/96 |
| 5,943,093 A * | 8/1999 | Anderson et al. ......... 348/231.6 |
| 6,763,182 B1 * | 7/2004 | Endo et al. ................... 386/124 |
| 7,084,908 B2 * | 8/2006 | Suda ....................... 348/231.2 |
| 2002/0197058 A1 * | 12/2002 | Suzuki et al. ................. 386/69 |
| 2003/0161616 A1 * | 8/2003 | Um et al. ..................... 386/121 |
| 2003/0184658 A1 * | 10/2003 | Fredlund et al. .......... 348/220.1 |
| 2004/0201747 A1 * | 10/2004 | Woods ................... 348/231.99 |

FOREIGN PATENT DOCUMENTS

| | | | |
|---|---|---|---|
| EP | 0946044 A2 * | 9/1999 |
| JP | 10-224745 A | 8/1998 |
| JP | 11-232440 A | 8/1999 |
| JP | 2003-037808 A | 2/2003 |
| JP | 2003-209809 | 7/2003 |
| JP | 2004-032236 A | 1/2004 |
| WO | 02/082258 A2 | 10/2002 |

* cited by examiner

*Primary Examiner*—David E Harvey
(74) *Attorney, Agent, or Firm*—Canon U.S.A. Inc., I.P. Division

(57) ABSTRACT

An imaging apparatus includes an image capturing unit for obtaining still-image data, a recording unit for recording, in a recording medium, the still-image data obtained by the image-capturing unit, and a play-list generating unit which, in a continuous shooting mode for obtaining a series of still images and recording a series of still-image-data items representing the still images recorded in the recording medium, generates a play list specifying a process for playing back the series of still-image-data items.

13 Claims, 12 Drawing Sheets

FIG. 3

```
/ 30
CARD/CAMERA SETTING MENU    △ ▽   SELECT  SETTING  SETTING
                                          MENU     END
                                                   / 31
┌─────────────────────────────────────────────────────────┐
│ CAMERA SETTING                                          │
└─────────────────────────────────────────────────────────┘
  CARD SETTING
  VCR SETTING
  AUDIO SETTING
  DISPLAY

MENU END
```

FIG. 4

```
/ 40
CARD/CAMERA SETTING MENU    △ ▽   SELECT  SETTING  SETTING
                                          MENU     END

STILL IMAGE QUALITY ················· SUPER FINE
  STILL IMAGE SIZE ···················· 1632×1224
  MOVING IMAGE SIZE ··················· 342×288
  RESET NUMBER ························ YES        / 41
┌─────────────────────────────────────────────────────────┐
│ AUTOMATICALLY GENERATE PLAY LIST ····· NO               │
└─────────────────────────────────────────────────────────┘

MENU END
```

FIG. 5

```
CARD/CAMERA SETTING MENU    △▽   SELECT  SETTING  SETTING
                                         MENU     END

AUTOMATICALLY GENERATE PLAY LIST ------ [YES]
                                         NO

MENU END
```

FIG. 6

```
CARD/CAMERA SETTING MENU    △▽   SELECT  SETTING  SETTING
                                         MENU     END

AUTOMATICALLY GENERATE PLAY LIST ------ YES
                                        [NO]

MENU END
```

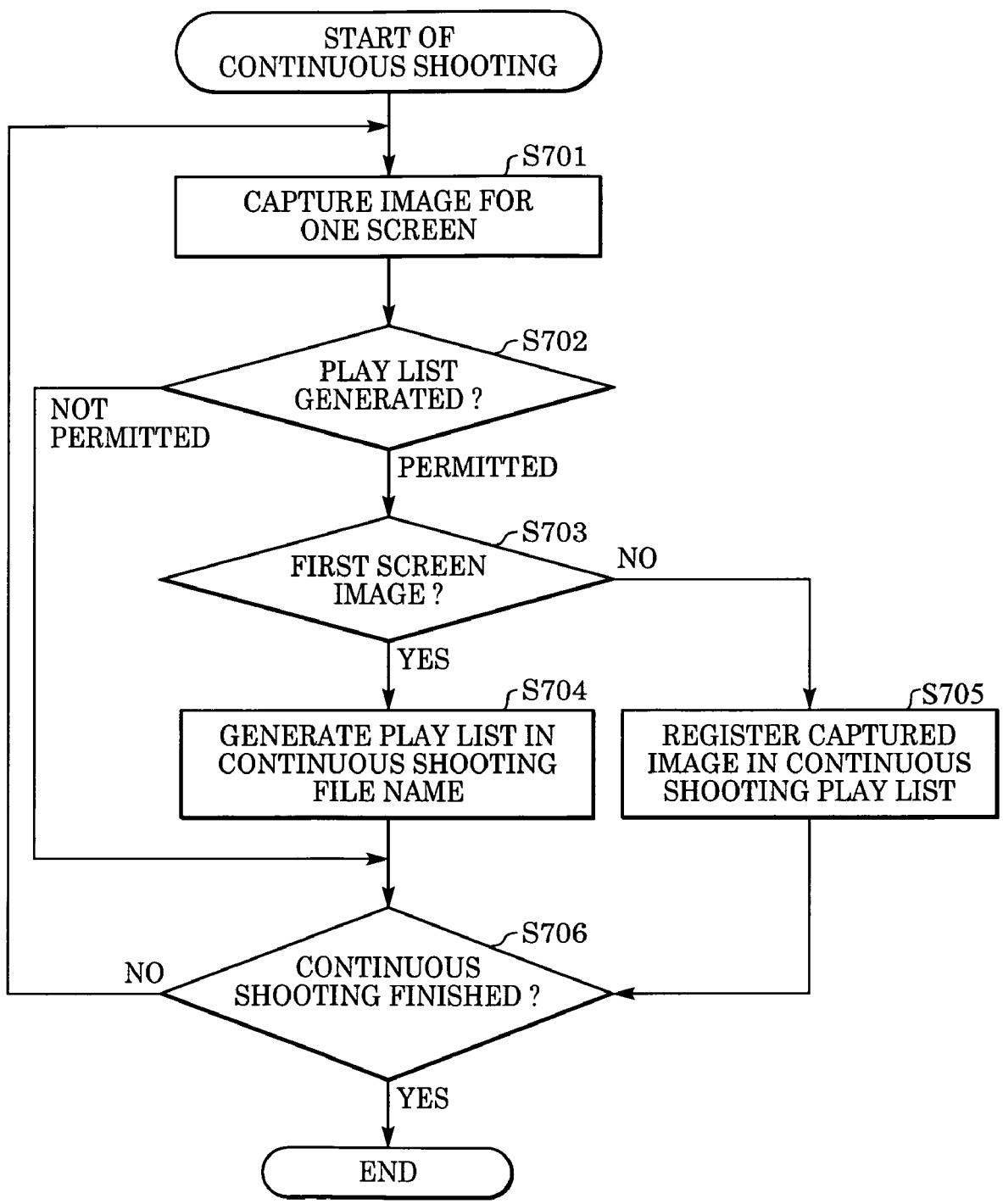

FIG. 8

```
CARD PLAYback MENU        △▽   SELECT  SETTING  SETTING
                                        MENU     END ┌─────────────────────────────────────────────────────────┐
│ EXECUTE CARD                                            │
└─────────────────────────────────────────────────────────┘
  VCR SETTING
  DISPLAY SETTING
  SYSTEM SETUP

MENU END
```

FIG. 9

```
CARD PLAYback MENU        △▽   SELECT  SETTING  SETTING
                                        MENU     END ERASE ALL PRINT SPECIFICATIONS
  ERASE IMAGE
  FORMAT
┌─────────────────────────────────────────────────────────┐
│ SELECT AND PLAY BACK PLAY LIST                          │
└─────────────────────────────────────────────────────────┘

<BACK
```

FIG. 13

[PlayList HRD]
data = 2003/11/01;
time = 13: 15: 05;
mode = cont;
total file = 30;
time space = 5;

[file list job]
Path = ¥DCIM¥101xxx
File = IMG_0101.jpg
File = IMG_0102.jpg
File = IMG_0103.jpg
File = IMG_0104.jpg
File = IMG_0105.jpg
File = IMG_0106.jpg

⋮

File = IMG_0123.jpg
File = IMG_0124.jpg
File = IMG_0125.jpg
File = IMG_0126.jpg
File = IMG_0127.jpg
File = IMG_0128.jpg
File = IMG_0129.jpg
File = IMG_0130.jpg
File = End

FIG. 15

```
CARD PLAYBACK MENU        △ ▽   SELECT  SETTING  SETTING
                                         MENU     END

EXECUTE CARD
VCR SETTING
DISPLAY SETTING
SYSTEM SETUP

MENU END
```

FIG. 16

```
CARD PLAYBACK MENU        △ ▽   SELECT  SETTING  SETTING
                                         MENU     END

ERASE ALL PRINT SPECIFICATIONS
ERASE IMAGE
FORMAT
SELECT AND PLAY BACK PLAY LIST
TRANSFER FILE BASED ON PLAY LIST

<BACK
```

IMAGING APPARATUS HAVING A CONTINUOUS SHOOTING FUNCTION

BACKGROUND OF THE INVENTION

1. Field of the Invention

The present invention relates to imaging apparatuses, and in particular, to an imaging apparatus having a continuous shooting function.

2. Description of the Related Art

Conventionally, digital cameras that record data of captured images as digital data in memory cards, etc., are known. A digital camera has various functions such as a single shooting function of capturing still images one by one, a continuous shooting function of continuously capturing plural still images, an automatic exposure bracketing (AEB) function of capturing a set of plural images while changing the brightness, and photo stitch that combines a set of still images to generate a still image.

Methods for viewing still images recorded in recording media include an index display function of displaying, on a screen, reduced images based on image-data items, and a slide show function (e.g., Japanese Patent Laid-Open No. 2003-209809) of sequentially displaying recorded images.

Among these functions, the slide show function sequentially displays image-data items recorded on a recording medium at regular intervals. After displaying all of the image-data items, the slide show function repeatedly displays the image-data items from the initially displayed image.

However, the slide show function has a problem in that, since all of the still-image-data items recorded in the recording medium are all displayed, the digital camera cannot play back a set of related still images captured by using a function such as continuous shooting or photo stitch in a form in which they are associated with one another or in an integrated manner.

SUMMARY OF THE INVENTION

The present invention addresses the above-identified problem. The present invention plays back a plurality of continuously-captured related still images in a form in which they are associated with one another.

According to an aspect of the present invention, an imaging apparatus is provided which includes an image capturing unit for obtaining still-image data, a recording unit for recording, in a recording medium, the still-image data obtained by the image-capturing unit, and a play-list generating unit which, in a continuous shooting mode for obtaining a series of still images and recording a series of still-image-data items representing the still images recorded in the recording medium, generates a play list specifying a process for playing back the series of still-image-data items.

According to an aspect of the present invention, an imaging method is provided which includes steps of capturing a series of still images in a continuous shooting mode, recording the series of still images captured in the continuous shooting mode in a recording medium; and generating a play list specifying a process for playing back a series of still-image-data items representing the series of still images recorded in the recording medium.

Further features and advantages of the present invention will become apparent from the following description of exemplary embodiments with reference to the attached drawings.

BRIEF DESCRIPTION OF THE DRAWINGS

FIG. 3 is an illustration of a menu screen.

FIG. 4 is an illustration of a card setting menu screen.

FIG. 5 is an illustration of a setting screen for automatically generating a play list.

FIG. 6 is an illustration of a setting screen for automatically generating a play list.

FIG. 7 is a flowchart showing a continuous shooting operation.

FIG. 8 is an illustration of a playback menu screen.

FIG. 9 is an illustration of a card execution menu screen.

FIG. 13 is an illustration of the internal configuration of play list files.

FIG. 15 is an illustration of a playback menu screen displayed in a personal-computer-connected state.

FIG. 16 is an illustration of a card execution menu displayed in a personal-computer-connected state.

DESCRIPTION OF THE EMBODIMENTS

An embodiment of the present invention is described below with reference to the accompanying drawings.

An overview of the configuration of an image recording/playback apparatus (imaging apparatus) in an embodiment of the present invention is described below.

Figure 1:
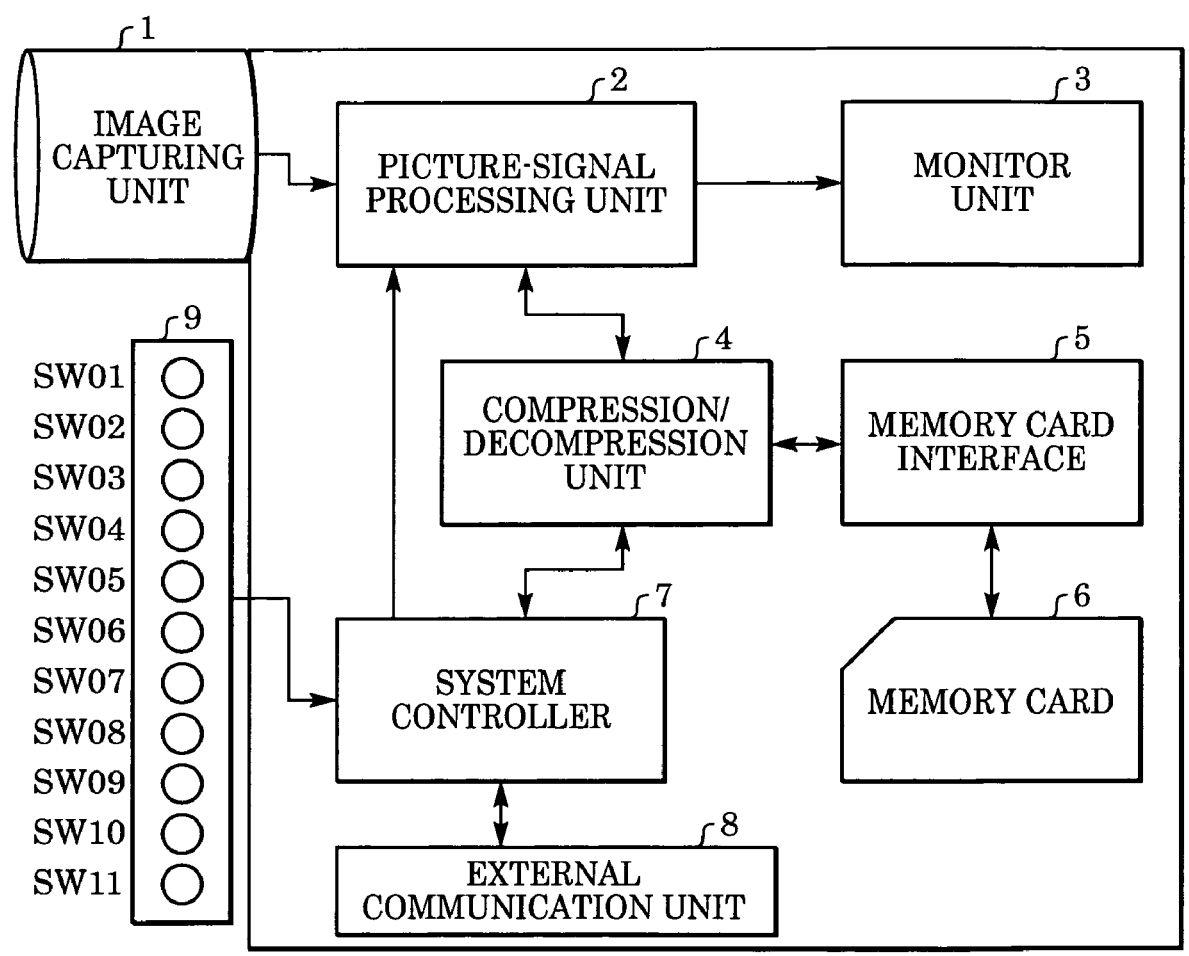
FIG. 1 is a block diagram showing an image recording/playback apparatus according to an embodiment of the present invention.

FIG. 1 is a block diagram showing a configuration of the image recording/playback apparatus in this embodiment. Referring to FIG. 1, an image capturing unit 1 captures a subject image and outputs a captured image signal. A picture-signal processing unit 2 outputs, based on the captured image signal output by the image capturing unit 1, image data of a still image or moving image, and a video signal. A monitor unit 3 displays an image represented by the image data output by the picture-signal processing unit 2, a user interface screen, etc. A compression/decompression unit 4 performs compression/decompression on still-image data or moving-image data output by the picture-signal processing unit 2.

A memory card interface 5 writes and reads image data in a memory card 6 (described below). The memory card 6 is a removable memory for storing image data, etc. The memory card 6 has the internal file configuration 20 shown in FIG. 2.

Figure 2:
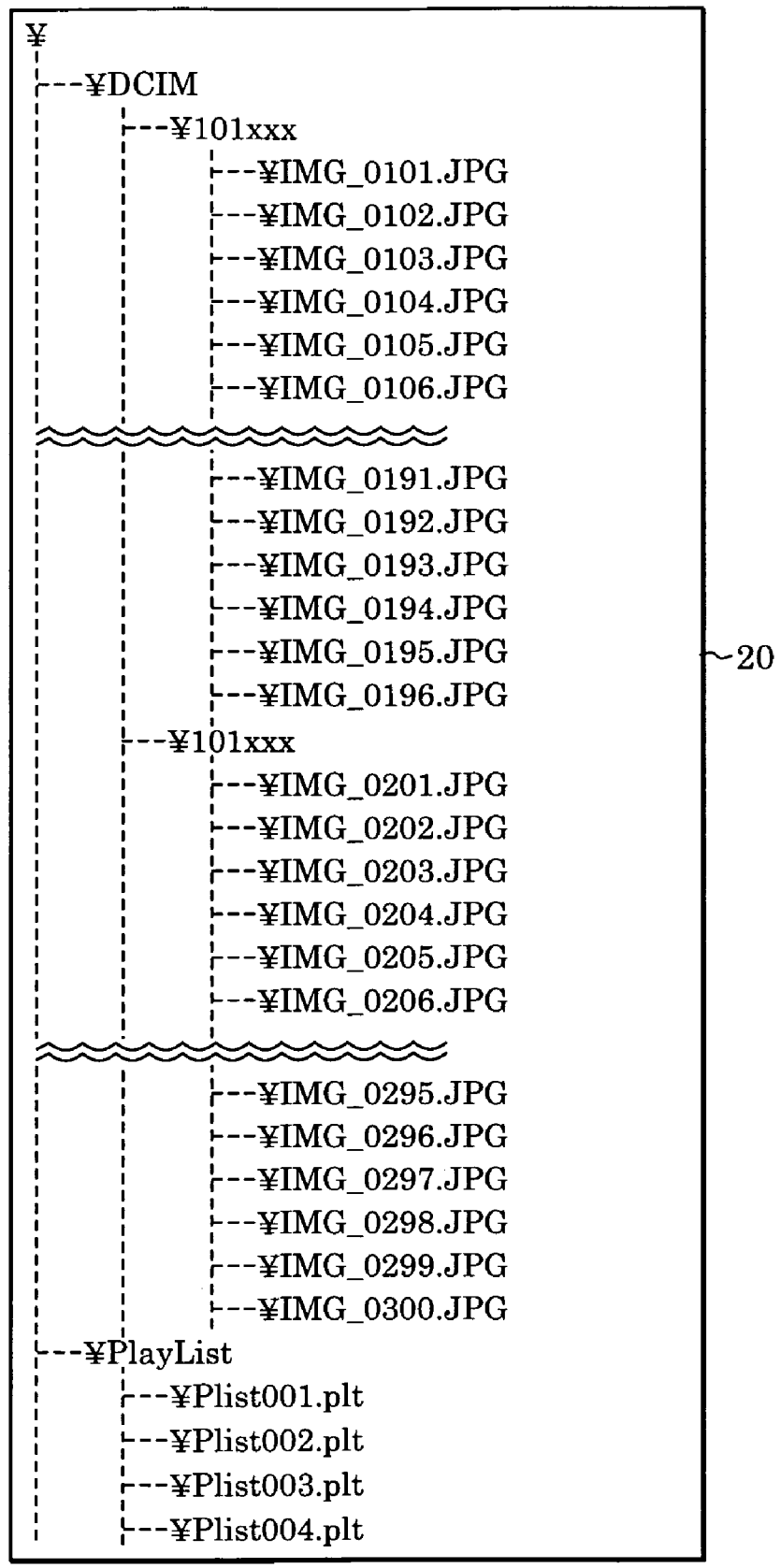
FIG. 2 is an illustration of the configuration of internal files in the memory card shown in FIG. 1.

FIG. 2 shows an example of the internal file configuration of the memory card 6. As shown in FIG. 2, the memory card 6 stores image data of still images (JPEG images in this embodiment) in its own directory "DCIM", and stores automatically-generated play lists in its own directory "PlayList". File names assigned to the play lists stored in the directory "PlayList" are "plist001.plt", "plist002.plt", etc. These file names are automatically assigned by the image recording/playback apparatus.

Each of the play lists in this embodiment is data describing a process for playing back the image data recorded in the memory card 6. The play lists are described in, for example, a description language such as SMIL (Synchronized Multimedia Integration Language) or XML (Extensible Markup Language). In this embodiment, in order to continuously play back plural files of continuously captured still images, the files are specified and a play list describing a playback process is automatically generated and recorded in the memory card 6.

A system controller 7 controls the operations of the picture-signal processing unit 2, the compression/decompression unit 4, an external communication unit 8 (described later), etc., and also controls the flow of data in the image recording/playback apparatus. The system controller 7 performs control in response to an instruction signal from a switch unit 9 (described later).

The external communication unit 8 establishes connection with a personal computer or other external apparatuses, and serves as a communication interface for inputting/outputting moving image files and still image files. The external communication unit 8 can establish communication by using, for example, USB (Universal Serial Bus) connection. The switch unit 9 is an operation unit including switches SW0 to SW11 such as a photo switch SW01, a menu switch SW02, an upwardly-moving menu-item selecting switch SW03, a downwardly-moving menu-item selecting switch SW04, a selected-item confirming switch SW05, and a switch SW07 for switching still-image recording between single shooting and continuous shooting.

The image recording/playback apparatus shown in FIG. 1 also has a function of selecting one of a single shooting mode and a continuous shooting mode by pressing, at a still-image recording time, the switch SW07 for switching still-image recording between single shooting and continuous shooting.

An example of a user interface for selecting one of the single shooting mode and the continuous shooting mode is described below. The image recording/playback apparatus provides a user thereof with the user interface by using the monitor unit 3 and the switch unit 9.

By pressing the menu switch SW02, the menu screen 30 shown in FIG. 3 is displayed on the monitor unit 3. FIG. 3 shows an example of a menu screen in this embodiment. On the menu screen 30 shown in FIG. 3, by using a selecting frame 31 to select the item "CARD SETTING" with the upwardly-moving menu-item selecting switch SW03 and the downwardly-moving menu-item selecting switch SW04, and pressing the selected-item confirming switch SW05, the card setting menu screen 40 shown in FIG. 4 is displayed on the monitor unit 3. FIG. 4 shows an example of a card setting menu in this embodiment.

By using a selecting frame 41 to select the item "AUTO-MATICALLY GENERATE PLAY LIST" on the card setting menu screen 40 with the upwardly-moving menu-item selecting switch SW03 and the downwardly-moving menu-item selecting switch SW04, and pressing the selected-item confirming switch SW05, the play-list automatic-generation setting screen 50 shown in FIG. 5 is displayed on the monitor unit 3. FIG. 5 shows an example of a play-list-automatic-generation setting screen in this embodiment.

By using a selecting frame 51 to select the item "YES" (representing implementation of automatic generation of a play list) on the play-list automatic-generation setting screen 50 with the upwardly-moving menu-item selecting switch SW03 and the downwardly-moving menu-item selecting switch SW04, the monitor unit 3 enters the display state shown in FIG. 6. FIG. 6 shows an example of a play-list automatic-generation setting screen in this embodiment. By pressing the menu switch SW02 again in the display state shown in FIG. 6, automatic generation of a play list can be selected. This performs automatic generation of a play list describing a playback process for playing back a series of image-date items that are generated by continuous shooting when the user continuously presses the photo switch SW01.

Next, a process for automatically generating a play list by a continuous shooting operation is described below. FIG. 7 is a flowchart showing a continuous shooting operation of the image recording/playback apparatus shown in FIG. 1.

Referring to FIG. 7, when a continuous operation on the photo switch SW01 causes detection of a continuous shooting mode, an image for one screen is captured (S701), and it is determined whether or not generation of a play list is permitted (S702). The generation of the play list is permitted by selecting the item "YES" for automatic generation of the play list, as shown in FIG. 6. When the generation of the play list is not permitted, the image recording/playback apparatus proceeds to step S706 and determines whether or not the continuous shooting operation has finished. If the continuous shooting operation has finished, processing ends. If the continuous shooting operation has not finished yet, the image recording/playback apparatus returns to step S701 and captures an image for the next screen.

If it is determined in step S702 that the generation of the play list is permitted, in step S703, it is determined whether or not image data of the still image captured in step S701 corresponds to the first still image in continuous shooting. If it is determined that the image data of the still image captured in step S701 corresponds to the first still image, a new play list (continuous shooting play list) is generated in the name of a continuous shooting file (S704). On the other hand, if it is determined in step S703 that the image data of the still image captured in step S701 does not correspond to the first still image, that is, the image data corresponds to a second or subsequent still image, the image data (file) obtained in step S701 is registered in the continuous shooting play list (S705). The above processing can generate a play list describing a playback process for automatically playing back a series of still images captured in the continuous shooting mode. After generating a new play list in the name of a continuous shooting file (S704) or registering the image data (file) in the continuous shooting play list (S705), processing proceeds to step S706 and determines whether or not the continuous shooting operation has finished. If the continuous shooting operation has finished, processing ends. If the continuous shooting operation has not finished yet, the image recording/playback apparatus returns to step S701 and captures an image for the next screen.

Next, the playback process in the playback mode is described below.

In the playback mode, a last captured still image or moving image is played back on activation of the power. In this state, by pressing the menu switch SW02 shown in FIG. 1, the playback menu screen 80 shown in FIG. 8 is displayed on the monitor unit 3.

FIG. 8 shows an example of a playback menu screen in this embodiment.

While the playback menu screen 80 is being displayed, by using a selecting frame 81 to select the item "EXECUTE CARD" with the upwardly-moving menu-item selecting switch SW03 and the downwardly-moving menu-item selecting switch SW04, the card playback menu 90 shown in FIG. 9 is displayed on the monitor unit 3. FIG. 9 shows an example of a card playback screen in this embodiment.

Figure 10:
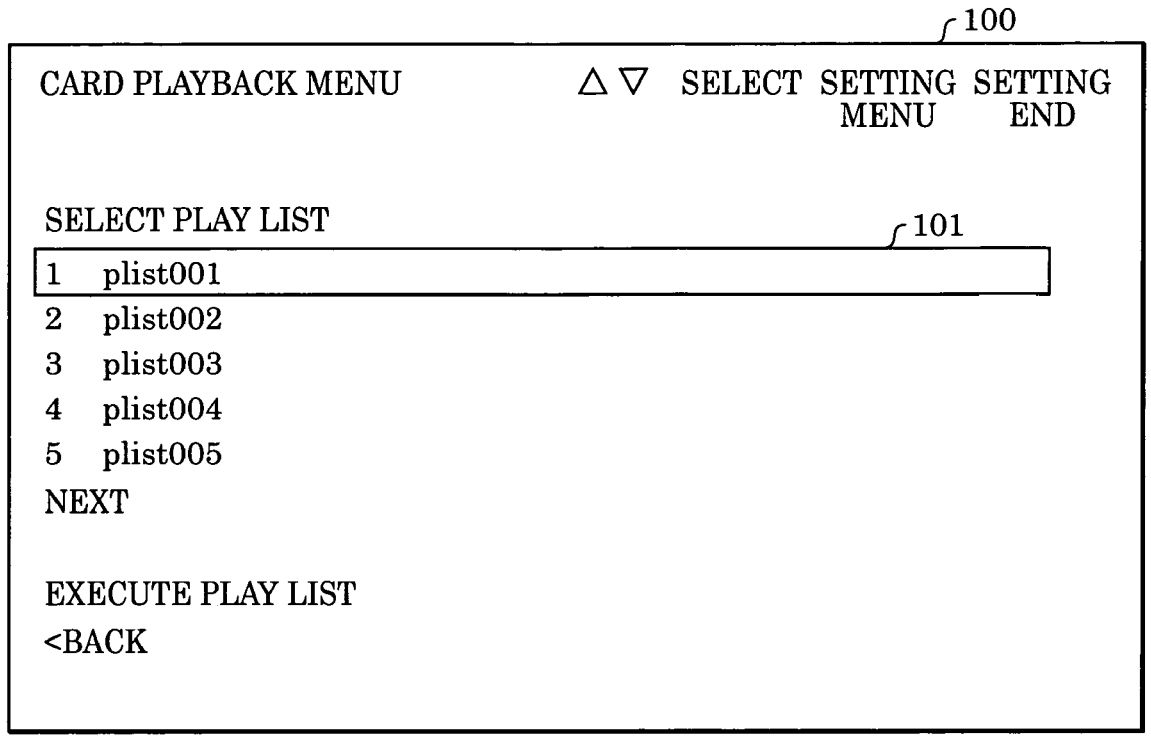
FIG. 10 is an illustration of a play list selecting screen.

While the card playback menu 90 is being displayed, by using a selecting frame 91 to select the item "SELECT AND PLAY BACK PLAY LIST" with the upwardly-moving menu-item selecting switch SW03 and the downwardly-moving menu-item selecting switch SW04, and pressing the selected-item confirming switch SW05, the play list selecting screen 100 shown in FIG. 10 is displayed on the monitor unit 3.

FIG. 10 shows an example of a play list selecting screen in this embodiment.

Figure 11:
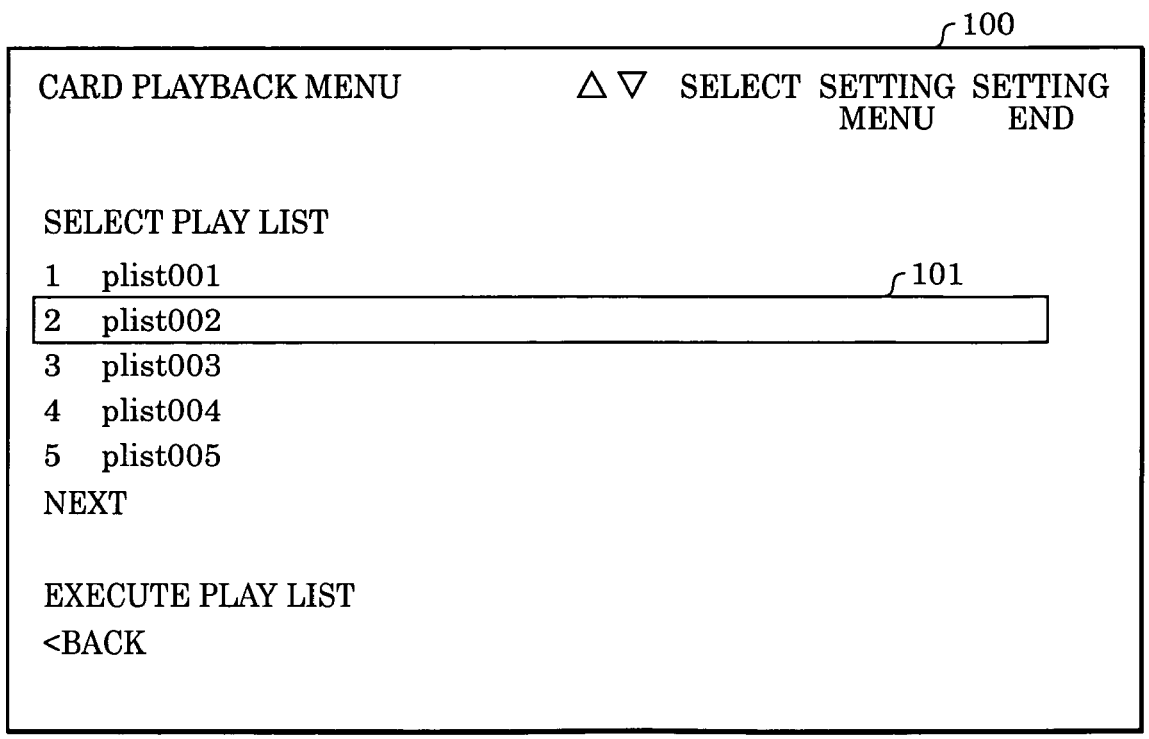
FIG. 11 is an illustration of a play list selecting screen.
Figure 12:
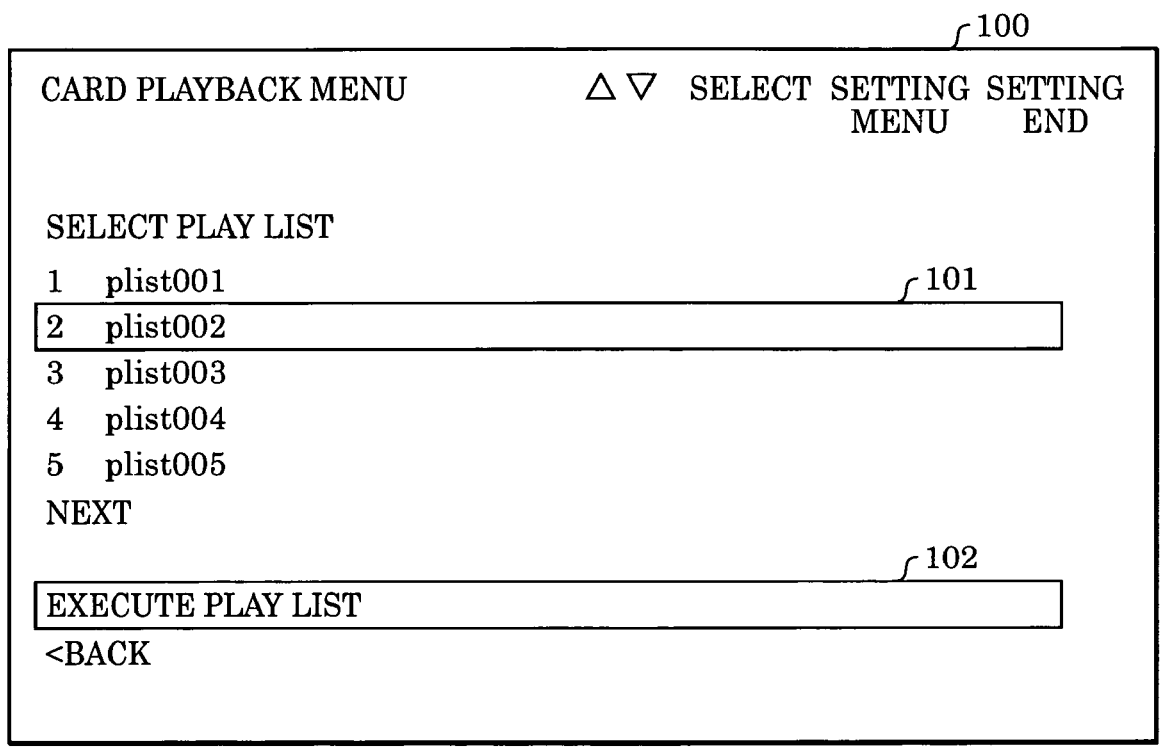
FIG. 12 is an illustration of a play list selecting screen.

While the play list selecting screen 100 is being displayed, by using a selecting frame 101 to select the item plist002.lst (indicated by "plist002") with the upwardly-moving menu-item selecting switch SW03 and the downwardly-moving menu-item selecting switch SW04, the monitor unit 3 enters the display state shown in FIG. 11. In this state as shown in FIG. 11, by pressing the selected-item confirming switch SW05, as shown in FIG. 12, a selecting frame 102 for selecting the item "EXECUTE PLAY LIST" is displayed on a play list selecting screen 100. As shown in FIG. 12, by pressing the selected-item confirming switch SW05, with the item "EXECUTE PLAY LIST" selected by the selecting frame 102, a series of still images (files) captured in continuous shooting which is described in a play list file having the file name "plist002.lst" is played back in described order.

An example of the internal configuration of the play list file (continuous shooting play list) in this embodiment is described below.

FIG. 13 shows an example of the internal configuration of a play list file 130. In the play list file 130 shown in FIG. 13, the item "total file" represents a state with thirty still images continuously recorded by continuous shooting. The item "time space" in the play list file 130 represents the number of images (hereinafter referred to as an "image-capturing interval") captured during one second in continuous shooting related to this play list. Under the item "file list job" in the play list file 130, file names of a series of still images captured in continuous shooting are shown in a list form. As described above, since an image-capturing interval in continuous shooting is recorded in the play list file 130, still image files can also be played back at time intervals that are identical to that in continuous shooting, and can be played back with a playback interval adjusted. In this embodiment, a play list is generated so that playback is performed at predetermined intervals of several seconds, for example, five seconds.

A playback time per still image may be described in the play list. In this case, still image files are played back at intervals as described in the list.

Next, a playback process based on a continuous shooting play list in the image recording/playback apparatus in this embodiment is described below.

Figure 14:
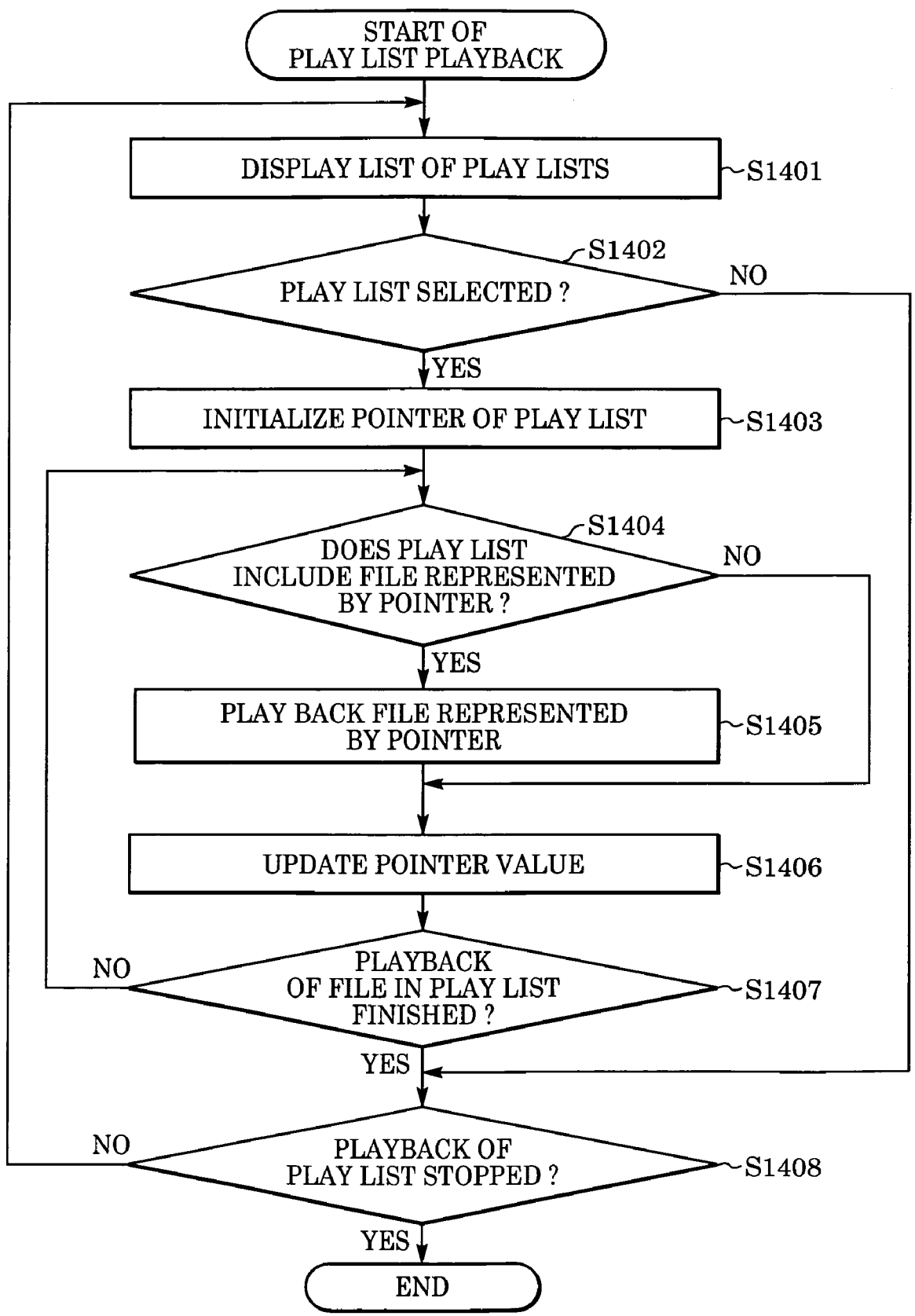
FIG. 14 is a flowchart showing a playback process based on a continuous shooting play list.

FIG. 14 shows the playback process based on a continuous shooting play list in the image recording/playback apparatus in this embodiment. The continuous shooting play list is the play list automatically generated in the continuous shooting described with reference to FIG. 7.

When the image recording/playback apparatus is instructed to perform playback based on the play list by using the selecting frame 91 to select the item "SELECT AND PLAY BACK PLAY LIST" in the card playback menu 90 shown in FIG. 9, the play list selecting screen 100 shown in FIG. 10 is used to display a list of play lists on the monitor unit 3 in step S1401. In step S1402, it is determined whether a play list is selected in the play list selecting screen 100 by the user. In this embodiment, based on changes in the play list selecting screen 100 which are shown in FIGS. 10 to 12 and whether or not an operation by the user has been performed, it is determined whether the play list is selected.

If it is determined in step S1402 that no play list is selected, the process proceeds to step S1408 and determines whether or not playback based on the play list is to be stopped. If it is determined that the playback based on the play list is to be stopped, the playback process based on the continuous shooting play list ends. If it is determined that the playback based on the play list is not to be stopped, the process returns to step S1401.

If it is determined in step S1402 that the play list is selected, in step S1403, a pointer of the play list is initialized. The pointer is a variable which, among still image files on the play list, specifies a still image file to be played back. In step S1404, it is determined whether or not there is the still image file indicated by the pointer. For example, by referring to the item "file list job" of the play list file 130 (shown in FIG. 13) whose file name is "plist002.lst", it is determined whether or not there is the still image file indicated by the pointer.

If it is determined in step S1404 that there is not the still image file indicated by the pointer, the process proceeds to step S1406. If it is determined in step S1404 that there is the still image file indicated by the pointer, in step S1405, the still image file (in the play list) indicated by the pointer is played back. In step S1406, the value of the pointer in the play list is updated to a value specifying the next still image file to be played back.

In step S1407, it is determined whether or not all of the still image files included in the selected play list have been played back. If it is determined in step S1407 that playback of all the still image files has finished, in step S1408, it is determined whether or not the playback based on the play list is to be stopped. If the playback based on the play list is to be stopped, the process directly ends. If it is determined in step S1407 that the playback of all the still image files has not finished yet, the process returns to step S1404 and repeatedly performs processing of steps S1404 to S1406 as described above.

As described above, according to the image recording/playback apparatus in this embodiment, a play list that defines the order of playing back a series of still image files generated in continuous shooting, etc., can be automatically generated. In addition, according to the image recording/playback apparatus in this embodiment, by selectively playing back a play list, a series of related still image files obtained in continuous shooting can be easily played back. In other words, by generating a play list that defines a relationship among related still images obtained in continuous shooting, and using the generated play list, a plurality of related still images obtained in continuous shooting can be played back in a form in which they are associated with one another.

Other Applications

Another application of the continuous shooting play list generated in the image recording/playback apparatus when it is connected to a personal computer is described below.

As described above, when the image recording/playback apparatus is in the playback mode, a last captured still image or moving image is played back on activation of the power and is displayed on the monitor unit 3. When, in this state, the external communication unit 8 shown in FIG. 1 is connected to a personal computer (not shown), and the user presses the menu switch SW02, the playback menu screen 150 shown in FIG. 15 is displayed on the monitor unit 3. FIG. 15 shows an example of a playback menu screen in this embodiment in a state connected to the personal computer. While the playback menu screen 150 is being displayed, by using a selecting frame 151 to select the item "EXECUTE CARD" with the upwardly-moving menu-item selecting switch SW03 and the downwardly-moving menu-item selecting switch SW04, and pressing the selected-item confirming switch SW05, the card execution menu screen 160 shown in FIG. 16 is displayed on the monitor unit 3. FIG. 16 shows an example of a card execution menu screen in this embodiment in the state connected to the personal computer.

Figure 17:
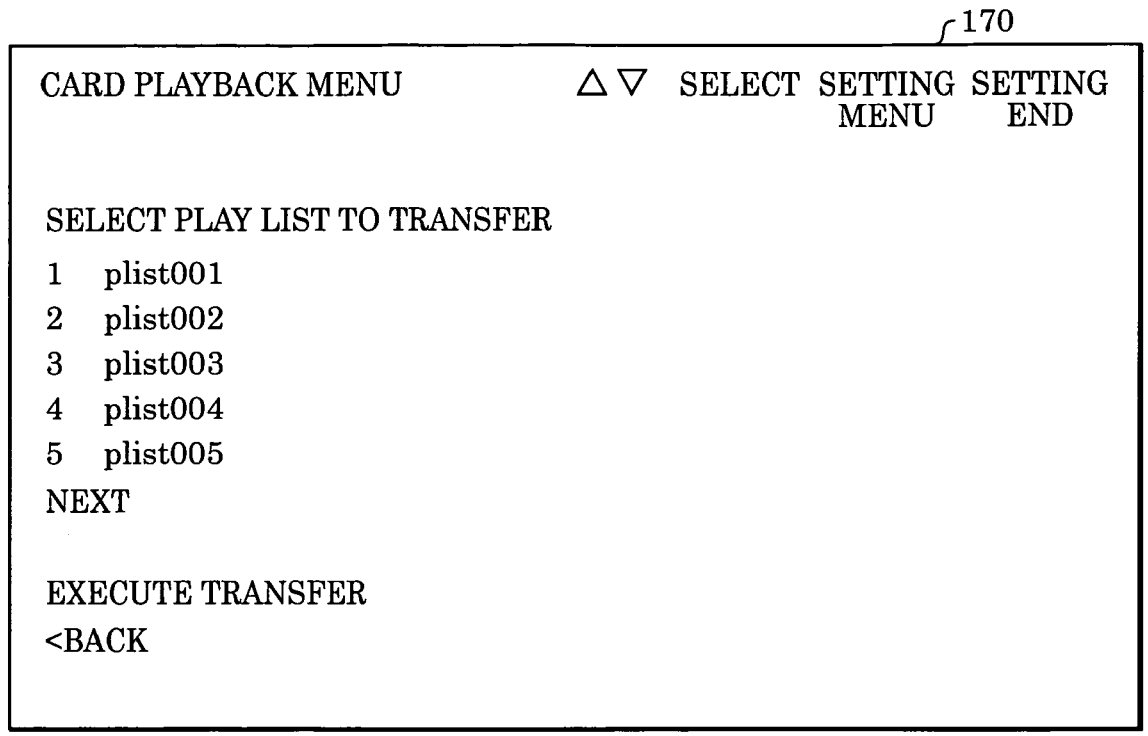
FIG. 17 is an illustration of a screen for selecting a play list to transfer.

While the card execution menu screen 160 is being displayed, by using a selecting frame 161 to select the item "TRANSFER FILE BASED ON PLAY LIST" with the upwardly-moving menu-item selecting switch SW03 and the downwardly-moving menu-item selecting switch SW04, and pressing the selected-item confirming switch SW05, the transfer play-list selecting screen 170 shown in FIG. 17 is displayed on the monitor unit 3. FIG. 17 shows an example of a screen for selecting a play list to transfer in this embodiment.

While the transfer play-list selecting screen 170 is being displayed, by using a selecting frame (not shown) to select the item plist002.lst (indicated by "plist002") with the upwardly-moving menu-item selecting switch SW03 and the downwardly-moving menu-item selecting switch SW04, and pressing the selected-item confirming switch SW05, the item "EXECUTE TRANSFER" becomes selectable. The above changes on the displayed screen are similar to those shown in FIGS. 10 to 12.

When the selected-item confirming switch SW05 is pressed by the user, with the item "EXECUTE TRANSFER" selected, a series of still image files described in the play list file whose file name is "plist002.lst" is transferred to the personal computer connected to the external communication unit 8. As described above, by generating a continuous shooting play list, the image recording/playback apparatus in this embodiment can easily, collectively transfer a series of continuously-captured still-image files to the personal computer.

The system controller 7 in the image recording/playback apparatus in this embodiment includes a central processing unit (CPU) and a memory. A program for implementing processing functions is read from the memory and executed by the CPU, in order to implement the processing functions shown in FIGS. 7 and 14. Alternatively, all or part of each processing function may be realized by dedicated hardware.

The above memory may be formed by a magneto-optical disk device, a nonvolatile memory such as a flash memory, a read-only recording medium such as a CD-ROM (compact disk—read-only memory), a volatile memory other than a RAM, or a computer-readable, computer-writable recording medium formed by combining the above recording media.

In addition, by recording, in a computer-readable recording medium, a program for allowing the above image recording/playback apparatus to implement functions performing various processes, and allowing a computer system to read and execute the program recorded in the recording medium, the processes may be performed. The "computer system" includes an operating system, and hardware such as peripheral devices.

The above program may be transmitted, from the computer system in which the program is stored in a storage unit or the like, to another computer system through a transmission medium or in the form of transmission waves in the transmission medium. The "transmission medium" that transmits the program is such an information-transmitting medium as a network (communication network) such as the Internet or a communication line such as a telephone line.

The above program may be for realizing a part of the above-described functions. The above program may also be one that combines a program already recorded in the computer system to implement the above-described functions, that is, a difference file (difference program).

Also a program product, such as a computer-readable recording medium having the above program recorded thereon, can be used as an embodiment of the present invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-435125 filed Dec. 26, 2003, which is hereby incorporated by reference herein.

What is claimed is:

1. An imaging apparatus comprising:
   image-capturing means;
   recording means for recording, in a recording medium, still-image data obtained by the image-capturing means;
   instructing means for instructing an image-capturing;
   mode-switching means for switching a mode of the apparatus between a plurality of modes including a single shooting mode in which the image-capturing means performs an image-capturing of a still image of one picture in accordance with an instruction by the instructing means and the recording means records, in a recording medium, a still-image-data item representing the still image of one picture and a continuous shooting mode in which the image-capturing means performs an image-capturing of a series of still images of plural pictures in accordance with an instruction by the instructing means and the recording means records, in the recording medium, a series of still-image-data items representing the series of the still images of plural pictures; and
   play-list generating means which, generates a play list for playing back, from among a plurality of still-image-data items recorded in the recording medium, the series of still-image-data items representing the series of the still images of plural pictures recorded in the continuous shooting mode,
   wherein the play-list generating means generates, in the continuous shooting mode, a new play list for each instruction by the instructing means,
   wherein the recording means stores the still-image-data item and the play list in a plurality of directories and records the still-image-data item and the play list each stored in the plurality of directories in the recording medium, and
   wherein the recording means stores the still-image-data item corresponding to the still image captured in the single shooting mode by the image-capturing means and the series of still-image-data items representing the series of the still images of plural pictures captured in the continuous shooting mode by the image-capturing means in a same directory and stores the plurality of play list generated for each of the instructions by the instructing means in another directory.

2. The imaging apparatus according to claim 1, further comprising playback means for playing back the series of still-image-data items from the recording medium in accordance with the play list generated by the play-list generating means.

3. The imaging apparatus according to claim 2, wherein:
   the play-list generating means generates the play list after adding, to the play list, information representing an image-capturing interval of the still-image-data items obtained in the continuous shooting mode; and based on the information representing the image-capturing interval added to the play list, the playback means plays back the still-image-data items at intervals in accordance with the image-capturing interval.

4. The imaging apparatus according to claim 1, further comprising transfer means for transferring the series of still-image-data items to another apparatus based on the play list.

5. The imaging apparatus according to claim 1, further comprising setting means for establishing a setting identifying whether the play list is to be generated by the play-list generating means in the continuous shooting mode.

6. The imaging apparatus according to claim 1, wherein:
the play-list generating means generates a play-list file storing the play list; and
the recording means records, in the recording medium, the play-list file and a still-image file storing the still-image data.

7. An imaging method comprising:
receiving an instruction for capturing images by an imaging apparatus in a respective mode selected from a plurality of modes including a single shooting mode in which the imaging apparatus performs image-capturing of a still image of one picture and a continuous shooting mode in which the imaging apparatus performs image-capturing of a series of still images of plural pictures:
switching an image capturing mode, in the imaging apparatus, in accordance with the received instruction for capturing images:
capturing one or more images, by the imaging apparatus, in accordance with the image capturing mode;
recording the images captured in a recording medium, a still-image-data item representing the still image of one picture and a series of still-image-data items representing the series of the still images of plural pictures captured in the continuous shooting mode; and
generating a play list for playing back, from among a plurality of still-image-data items recorded in the recording medium, the series of still-image-data items representing the series of the images of plural pictures recorded in the continuous shooting mode, wherein, in the continuous shooting mode, a new play list is generated for each received instruction:

wherein the still-image-data item and the play list are recorded in a plurality of directories in the recording medium, and wherein the still-image-data item corresponding to the still image captured in the single shooting mode by the imaging apparatus is recorded on the recording medium the series of still-image-data items representing the series of the still images of plural pictures captured by the imaging apparatus in the continuous mode are stored in a same directory and the plurality of play lists generated for each instruction are stored in another directory.

8. The imaging method according to claim 7, further comprising playing back the series of still-image-data items from the recording medium in accordance with the play list generated.

9. The imaging method according to claim 8, wherein:
the play-list is generated after adding, to the play list, information representing an image-capturing interval of the still-image-data items obtained in the continuous shooting mode; and
based on the information representing the image-capturing interval added to the play list, the still-image-data items are played back at intervals in accordance with the image-capturing interval.

10. The imaging method according to claim 7, further comprising transferring the series of still-image-data items to another apparatus based on the play list.

11. The imaging method according to claim 7, further comprising establishing a setting identifying whether the play list is to be generated by the play-list generating means in the continuous shooting mode.

12. The imaging method according to claim 7, further comprising:
generating a play-list file storing the play list; and
recording, in the recording medium, the play-list file and a still-image file storing the still-image data.

13. A computer-readable medium storing computer-executable instructions for performing a method according to claim 7.

* * * * *